(12) United States Patent
Guedalia et al.

(10) Patent No.: US 9,088,641 B2
(45) Date of Patent: Jul. 21, 2015

(54) METHOD AND SYSTEM FOR TRANSMITTING AUDIO DATA BETWEEN COMPUTING DEVICES

(75) Inventors: Jacob Guedalia, Newton, MA (US); Isaac David Guedalia, Bet Shemesh (IL)

(73) Assignee: QUALCOMM INCORPORATED, San Diego, CA (US)

( * ) Notice: Subject to any disclaimer, the term of this patent is extended or adjusted under 35 U.S.C. 154(b) by 1388 days.

(21) Appl. No.: 11/971,605

(22) Filed: Jan. 9, 2008

(65) Prior Publication Data

US 2008/0181165 A1 Jul. 31, 2008

Related U.S. Application Data

(60) Provisional application No. 60/884,045, filed on Jan. 9, 2007.

(51) Int. Cl.
| | |
|---|---|
| *H04L 12/66* | (2006.01) |
| *H04L 12/28* | (2006.01) |
| *H04M 7/12* | (2006.01) |
| *H04L 29/06* | (2006.01) |

(52) U.S. Cl.
CPC ........... *H04M 7/122* (2013.01); *H04L 65/1069* (2013.01); *H04L 65/1006* (2013.01)

(58) Field of Classification Search
CPC .............. H04L 12/4625; H04L 12/462; H04L 12/40097; H04L 12/40091
USPC .......................................... 370/351–356, 401
See application file for complete search history.

(56) References Cited

U.S. PATENT DOCUMENTS

| | | | |
|---|---|---|---|
| 4,751,728 A | | 6/1988 | Treat |
| 4,799,253 A | * | 1/1989 | Stern et al. ..................... 455/448 |
| 5,570,417 A | | 10/1996 | Byers |
| 5,577,100 A | | 11/1996 | McGregor et al. |
| 5,635,940 A | | 6/1997 | Hickman et al. |
| 5,848,128 A | | 12/1998 | Frey |
| 5,878,122 A | | 3/1999 | White et al. |
| 5,913,162 A | | 6/1999 | Gourdin et al. |

(Continued)

FOREIGN PATENT DOCUMENTS

| | | |
|---|---|---|
| DE | 10341737 A1 | 4/2005 |
| EP | 1179941 A | 2/2002 |

(Continued)

OTHER PUBLICATIONS

Saravanan Shanmugham, et al., Daniel C. Burnett, "Media Resource Control Protocol Version 2(MRCPv2)", IETF Standard-Working-Draft, Internet Engineering Task Force, IETF, vol. Speechsc, No. 6, pp. 1-176 (2005).

(Continued)

*Primary Examiner* — Steven H Nguyen
(74) *Attorney, Agent, or Firm* — Muncy, Geissler, Olds & Lowe, P.C.

(57) ABSTRACT

The present disclosure relates to transmitting data between a plurality of computing devices such as mobile telephones and other electronic communications devices, where a request is associated with placing a call to a contact, and where information associated with the request is stored and a request for a SIP proxy is made, and an IP address associated with the SIP proxy is transmitted to allow redirecting the call to a server via the SIP proxy.

18 Claims, 2 Drawing Sheets

(56) References Cited

U.S. PATENT DOCUMENTS

| | | |
|---|---|---|
| 5,946,618 A | 8/1999 | Agre et al. |
| 6,044,263 A | 3/2000 | Valentine et al. |
| 6,188,762 B1 | 2/2001 | Shooster |
| 6,205,126 B1 | 3/2001 | Moon |
| 6,333,931 B1 | 12/2001 | LaPier et al. |
| 6,564,261 B1 | 5/2003 | Gudjonsson et al. |
| 6,618,590 B1 | 9/2003 | Howe |
| 6,678,364 B2 | 1/2004 | Ruckart |
| 6,687,362 B1 | 2/2004 | Lindquist et al. |
| 6,697,858 B1 | 2/2004 | Ezerzer et al. |
| 6,707,811 B2 | 3/2004 | Greenberg et al. |
| 6,751,457 B1 | 6/2004 | Martin |
| 6,775,375 B1 | 8/2004 | Bhusri |
| 6,850,762 B1 | 2/2005 | Ala-Luukko et al. |
| 6,917,610 B1 | 7/2005 | Kung et al. |
| 6,937,873 B2 | 8/2005 | Levy et al. |
| 7,039,164 B1 | 5/2006 | Howe |
| 7,085,260 B2 | 8/2006 | Karaul et al. |
| 7,099,652 B2 | 8/2006 | Brown et al. |
| 7,110,772 B1 | 9/2006 | Wu |
| 7,127,488 B1 * | 10/2006 | Scott et al. ............. 709/204 |
| 7,130,620 B2 | 10/2006 | Forman et al. |
| 7,139,370 B1 * | 11/2006 | Tse ................. 379/88.17 |
| 7,243,075 B1 | 7/2007 | Shaffer et al. |
| 7,257,837 B2 * | 8/2007 | Xu et al. ................ 726/12 |
| 7,274,786 B2 | 9/2007 | Fleischer, III et al. |
| 7,280,652 B2 | 10/2007 | Bocking et al. |
| 7,369,650 B1 | 5/2008 | Bhusri |
| 7,395,057 B2 | 7/2008 | Awasthi et al. |
| 7,436,820 B2 * | 10/2008 | Beck et al. ............. 370/352 |
| 7,471,692 B1 | 12/2008 | Erickson |
| 7,480,723 B2 * | 1/2009 | Grabelsky et al. ........... 709/228 |
| 7,529,231 B2 * | 5/2009 | Soo et al. ............. 370/352 |
| 7,548,611 B2 | 6/2009 | Howe et al. |
| 7,620,404 B2 | 11/2009 | Chesnais et al. |
| 7,634,509 B2 | 12/2009 | Onyon et al. |
| 7,701,883 B2 * | 4/2010 | Beckemeyer ............. 370/260 |
| 7,738,861 B2 * | 6/2010 | Fournier ................ 455/415 |
| 7,974,610 B2 | 7/2011 | Nachum |
| 8,116,836 B2 | 2/2012 | Ki |
| 2001/0038624 A1 | 11/2001 | Greenberg et al. |
| 2002/0013163 A1 | 1/2002 | O'Prey |
| 2002/0099670 A1 | 7/2002 | Jakobsson |
| 2002/0120760 A1 * | 8/2002 | Kimchi et al. ............ 709/230 |
| 2002/0129103 A1 | 9/2002 | Birkler et al. |
| 2002/0169984 A1 | 11/2002 | Kumar et al. |
| 2002/0193107 A1 | 12/2002 | Nascimento |
| 2003/0013441 A1 | 1/2003 | Bhogal et al. |
| 2003/0046404 A1 * | 3/2003 | O'Neill et al. ............ 709/228 |
| 2003/0046405 A1 * | 3/2003 | O'Neill et al. ............ 709/228 |
| 2003/0050051 A1 * | 3/2003 | Vilander ............... 455/414 |
| 2003/0060211 A1 | 3/2003 | Chern et al. |
| 2003/0091024 A1 | 5/2003 | Stumer |
| 2003/0115138 A1 | 6/2003 | Brown et al. |
| 2003/0118175 A1 | 6/2003 | Hariri et al. |
| 2003/0148790 A1 | 8/2003 | Pappalardo et al. |
| 2003/0190025 A1 | 10/2003 | Okamura et al. |
| 2004/0019539 A1 | 1/2004 | Raman et al. |
| 2004/0037396 A1 | 2/2004 | Gray et al. |
| 2004/0044771 A1 | 3/2004 | Allred et al. |
| 2004/0143669 A1 | 7/2004 | Zhao et al. |
| 2004/0156394 A1 * | 8/2004 | Westman ................ 370/471 |
| 2004/0165714 A1 | 8/2004 | Pinault |
| 2004/0202117 A1 | 10/2004 | Wilson et al. |
| 2004/0203643 A1 | 10/2004 | Bhogal et al. |
| 2004/0213209 A1 | 10/2004 | O'Connor et al. |
| 2004/0229644 A1 | 11/2004 | Heie et al. |
| 2004/0235509 A1 | 11/2004 | Burritt et al. |
| 2005/0025043 A1 | 2/2005 | Mussman et al. |
| 2005/0027867 A1 | 2/2005 | Mueller |
| 2005/0033852 A1 * | 2/2005 | Tenhunen ............. 709/229 |
| 2005/0033985 A1 * | 2/2005 | Xu et al. ............... 713/201 |
| 2005/0036597 A1 | 2/2005 | Kobrosly et al. |
| 2005/0059418 A1 | 3/2005 | Northcutt |
| 2005/0070230 A1 | 3/2005 | Das et al. |
| 2005/0102257 A1 | 5/2005 | Onyon et al. |
| 2005/0138571 A1 | 6/2005 | Keskar et al. |
| 2005/0157858 A1 | 7/2005 | Rajagopalan et al. |
| 2005/0163065 A1 | 7/2005 | Yule |
| 2005/0171799 A1 | 8/2005 | Hull et al. |
| 2005/0182798 A1 | 8/2005 | Todd et al. |
| 2005/0198031 A1 | 9/2005 | Pezaris et al. |
| 2005/0198172 A1 | 9/2005 | Appelman et al. |
| 2005/0198365 A1 | 9/2005 | Wei |
| 2005/0221847 A1 | 10/2005 | Brehler et al. |
| 2005/0249344 A1 * | 11/2005 | Mueller et al. .......... 379/207.15 |
| 2005/0273512 A1 | 12/2005 | Cho |
| 2005/0287997 A1 * | 12/2005 | Fournier ................ 455/415 |
| 2006/0018306 A1 * | 1/2006 | Nishida et al. ............ 370/352 |
| 2006/0018311 A1 * | 1/2006 | Kobayashi et al. ........... 370/356 |
| 2006/0023701 A1 * | 2/2006 | Nishida et al. ............ 370/352 |
| 2006/0026288 A1 * | 2/2006 | Acharya et al. ............ 709/227 |
| 2006/0029042 A1 * | 2/2006 | Nishida et al. ............ 370/352 |
| 2006/0029043 A1 * | 2/2006 | Nishida et al. ............ 370/352 |
| 2006/0029046 A1 * | 2/2006 | Nishida et al. ............ 370/352 |
| 2006/0031368 A1 | 2/2006 | DeCone |
| 2006/0040711 A1 | 2/2006 | Whistler et al. |
| 2006/0077932 A1 * | 4/2006 | Takeda et al. ............ 370/331 |
| 2006/0159456 A1 | 7/2006 | Gumaste et al. |
| 2006/0168215 A1 | 7/2006 | Baldwin et al. |
| 2006/0173961 A1 | 8/2006 | Turski et al. |
| 2006/0205400 A1 | 9/2006 | Kiyomoto |
| 2006/0209690 A1 | 9/2006 | Brooke et al. |
| 2006/0236388 A1 | 10/2006 | Ying et al. |
| 2006/0246877 A1 | 11/2006 | Kashanian et al. |
| 2006/0248146 A1 | 11/2006 | Wilk |
| 2006/0270392 A1 * | 11/2006 | Scott et al. ............. 455/414.2 |
| 2006/0270400 A1 | 11/2006 | DaSilva et al. |
| 2007/0005776 A1 | 1/2007 | Hansen et al. |
| 2007/0016682 A1 | 1/2007 | Hodgson |
| 2007/0060100 A1 | 3/2007 | Watler et al. |
| 2007/0064607 A1 | 3/2007 | Moon et al. |
| 2007/0071006 A1 | 3/2007 | Bosch et al. |
| 2007/0112964 A1 | 5/2007 | Guedalia et al. |
| 2007/0143397 A1 | 6/2007 | Guedalia et al. |
| 2007/0162350 A1 | 7/2007 | Friedman |
| 2007/0281676 A1 | 12/2007 | Borras et al. |
| 2007/0287430 A1 | 12/2007 | Hosain et al. |
| 2008/0003964 A1 | 1/2008 | Alperin et al. |
| 2008/0013531 A1 | 1/2008 | Elliott et al. |
| 2008/0037524 A1 * | 2/2008 | Koch et al. ............. 370/352 |
| 2008/0056208 A1 | 3/2008 | Hinrikus et al. |
| 2008/0056235 A1 * | 3/2008 | Albina et al. ............. 370/352 |
| 2008/0070579 A1 | 3/2008 | Kankar et al. |
| 2008/0076409 A1 | 3/2008 | Hinrikus et al. |
| 2008/0096592 A1 | 4/2008 | Waytena et al. |
| 2008/0139210 A1 | 6/2008 | Gisby et al. |
| 2008/0159261 A1 * | 7/2008 | Bessis ................. 370/352 |
| 2008/0159515 A1 | 7/2008 | Rines |
| 2008/0166999 A1 | 7/2008 | Guedalia et al. |
| 2008/0167019 A1 | 7/2008 | Guedalia et al. |
| 2008/0167020 A1 | 7/2008 | Guedalia et al. |
| 2008/0167039 A1 | 7/2008 | Guedalia et al. |
| 2008/0188227 A1 | 8/2008 | Guedalia et al. |
| 2008/0192910 A1 | 8/2008 | Guedalia et al. |
| 2008/0244023 A1 | 10/2008 | Guedalia et al. |
| 2008/0248795 A1 | 10/2008 | Petersen et al. |
| 2008/0263170 A1 | 10/2008 | Caron et al. |
| 2008/0305782 A1 | 12/2008 | Guedalia et al. |
| 2009/0190738 A1 | 7/2009 | Guedalia et al. |
| 2010/0080376 A1 * | 4/2010 | Hartley et al. ........... 379/211.02 |
| 2011/0312308 A1 | 12/2011 | Willey |
| 2013/0137421 A1 | 5/2013 | Guedalia et al. |

FOREIGN PATENT DOCUMENTS

| | | |
|---|---|---|
| EP | 1517256 A2 | 3/2005 |
| EP | 1701569 A | 9/2006 |
| GB | 2391135 A | 1/2004 |
| WO | 9723083 | 6/1997 |
| WO | WO 98/47298 A3 | 10/1998 |
| WO | WO 9934628 A | 7/1999 |
| WO | 0198867 A2 | 12/2001 |
| WO | 0215030 A1 | 2/2002 |

(56) References Cited

FOREIGN PATENT DOCUMENTS

| WO | 0221779 A1 | 3/2002 |
|---|---|---|
| WO | 0239237 A | 5/2002 |
| WO | WO 03032613 A | 4/2003 |
| WO | 03094011 A1 | 11/2003 |
| WO | 2005065296 A | 7/2005 |
| WO | 2006039552 A2 | 4/2006 |
| WO | WO 2006/044654 A | 4/2006 |
| WO | 2007001850 A1 | 1/2007 |
| WO | 2007005124 A2 | 1/2007 |
| WO | 2007025373 A | 3/2007 |
| WO | 2007109559 A2 | 9/2007 |
| WO | 2008013642 A2 | 1/2008 |

OTHER PUBLICATIONS

Sinnreich, et al., "SIP telephony device requirements and configuration draft-sinnreich-sipdev-req-07.txt", IETF Standard-Working-Draft, Internet Engineering Task Force, No. 7, pp. 1-37 (2005).

Griffin et al., "Integrating SIP, presence and FTP to provide wireless multimedia messaging", Wireless Communications and Networking Conference, IEEE Communications Society, 4:2581-2586 (2004).

Handley et al., "RFC 2543 SIP: Session Initiation Protocol", IETF Standard, Internet Engineering Task Force, pp. 1-153 (1999).

Handley et al., "SIP: Session Initiation Protocol", IETF, Standard-Working-Draft, Internet Engineering Task Force, vol. 4, pp. 1-83 (1997).

Petrie, Pingtel Corp., A Framework for SIP User Agent Profile Delivery draft-iet f-sipping-config-framework-02.txt., IETF Standard-Working-Draft, Internet Engineering Task Force, No. 2, pp. 1-22 (2004).

Colman Ho, "Voice Over Internet Protocol (VoIP) Overview", Presentation to TSACC, Mar. 23, 2004; www.isacc.ca/isacc/_doc/Book%2017%20-%202004/TSACC-04-31305.ppt.

Alcatel-Lucent, "Alcatel-Lucent OmniPCX Enterprise Communication Server: Delivering powerful, reliable and scalable IP communications to drive your 21st century business", 2007. http://www1.alcatel-lucent.com/com/en/appcontent/opgss/ENT_OmniPCX%20Enterprise_datasheet_1007_EN_tcm228-1353221635.pdf.

SIP Connect, "CableLabs Proposal for SIP Connect 1.1", 2007; http://www.sipforum.org/component/option,com_docman/task,doc_view/gid,149/Itemid,75/.

NST, New Standard Telephony, Convergence Simplified, Company Profile, NST 2005; http://www.ns-tel.com/files/NST_Company_Profile.pdf.

Janne Lundqvist et al., Messaging-over-IP—A network for messaging and information services; http://www.ericsson.com/ericsson/corpinfo/publications/review/1999_03/files/1999035. pdf.

Case Study, Intel Centrino, Mobile Technology, Intel Xeon Processor MP, Shanghai GM, "Seamless Communications", http://www.intel.com/netcomms/technologies/voice/310998.pdf.

Kundan Narendra Singh, Thesis, "Reliable, Sealable and Interoperable Internet Telephony", Columbia University, 2006; http://www1.cs.columbia.edu/~kns10/publication/thesis.pdf.

Intel Communications Alliance, "TeleSym and Intel Deliver Voice-over-Internet-Protocol (VoIP) Enterprise Communication Solution", Jun. 2004; http://www.intel.com/network/csp/pdf/9003wp.pdf.

Sinnreich/Pulver Com H. et al.: "*SIP Telephony Device Requirements and Configuration*; draft-sinnreich-sipdev-req-08.txt", IETF Standard-Working-Draft, Internet Engineering Task Force, IETF, CH, No. 8, Oct. 1, 2005, XP015043067 ISSN: 0000-0004.

Rosenberg, J. et al.: "*SIP: Session Initiation Protocol*" 20020601; 20020600; Jun. 1, 2002, pp. 1-269, XP015009039.

Schulzrinne Columbia University B. Volz Ericsson H: "*Dynamic Host Configuration Protocol (DHCPv6) Options for Session Initiation Protocol (SIP) Servers; rfc3319.txt*", IETF Standard, Internet Engineering Task Force, IETF, CH. Jul. 1, 2003, XP015009189; ISSN: 0000-0003.

International Search Report and Written Opinion—PCT/US2008/050615, International Searching Authority—European Patent Office, Nov. 18, 2008.

* cited by examiner

METHOD AND SYSTEM FOR TRANSMITTING AUDIO DATA BETWEEN COMPUTING DEVICES

CLAIM OF PRIORITY AND RELATED APPLICATIONS

This application claims priority under 35 U.S.C. §119(e) to U.S. Provisional Application No. 60/884,045 filed Jan. 9, 2007, the entirety of which is incorporated by reference herein.

BACKGROUND

Protocols often define ways in which computing devices connect to each other and to a network using Voice over IP ("VoIP"). Session Initiation Protocol ("SIP") is a popular VoIP protocol that allows a user to communicate with one or more other users via the Internet. SIP cans placed over a broadband Internet connection are often of digital quality and usually provide features, such as voicemail and email, that are not available through traditional telephone calling methods.

Methods of communicating between two or more SIP phones and two or more computers are known in the art. These methods usually involve the flow of real-time transfer protocol ("RTP") media, such as audio data, between two devices without the use of an intermediary. This communication is possible because both devices are configured to use RTP. However, if this is not possible, service providers may encounter difficulties in establishing communication between two or more devices.

SUMMARY

Before the present methods are described, it is to be understood that this invention is not limited to the particular systems, methodologies or protocols described, as these may vary. It is also to be understood that the terminology used herein is not intended to limit the scope of the present disclosure.

Generally, and in some preferred embodiments, the present disclosure relates to transmitting data between a plurality of computing devices, such as mobile telephones and other electronic communications devices, where a request is associated with placing a call to a contact, and where information associated with the request is stored and a request for a SIP proxy is made, and an IP address associated with the SIP proxy is transmitted to allow redirecting the call to a server via the SIP proxy.

Accordingly, one embodiment of the present invention is directed to a method of transmitting data between two computing devices, including acts of receiving, from a mobile device, a request associated with placing a call to a contact; storing at least a portion of information associated with the request; transmitting one or more of a data network identifier; receiving the call from the mobile device, wherein the call is initiated to the data network identifier; locating the stored portion of information associated with the request corresponding to the call; receiving a request for a SIP proxy; transmitting an IP address associated with the SIP proxy; and redirecting the call to a server via the SIP proxy.

In a related embodiment, receiving the request comprises receiving a request that comprises one or more of a session identification number and a contact identification number.

In another related embodiment, storing at least a portion of the information comprises storing one or more of a mobile network code, a mobile country code, a session identification number, a contact identification number, a mobile subscriber integrated services digital network number and a name associated with the contact.

In yet another related embodiment, receiving a call includes receiving the call comprising a dial-tone multi-frequency sequence.

In still another related embodiment, locating the stored portion of information includes determining whether the call comprises a mobile subscriber integrated services digital network number; if so, using the mobile subscriber integrated services digital network number to locate the stored portion of information; and if not, using the dial-tone multi-frequency sequence to locate the stored portion of information.

In another related embodiment, receiving a request for a SIP proxy includes receiving a request from a fat client.

Another related embodiment includes transmitting an IP address associated with the SIP proxy and transmitting an IP address associated with the SIP proxy to a fat client.

Yet another related embodiment includes redirecting the call to a server via the SIP proxy, including transmitting authentication information to the SIP proxy.

And another related embodiment includes redirecting the call to a server via the SIP proxy, and providing, by the SIP proxy, an audio channel by summoning an RTP; and initiating communication with a computing device associated with the contact over the RTP.

BRIEF DESCRIPTION OF THE DRAWINGS

Aspects, features, benefits and advantages of the present invention will be apparent with regard to the following description and accompanying drawings, of which.

DETAILED DESCRIPTION

Figure 1:
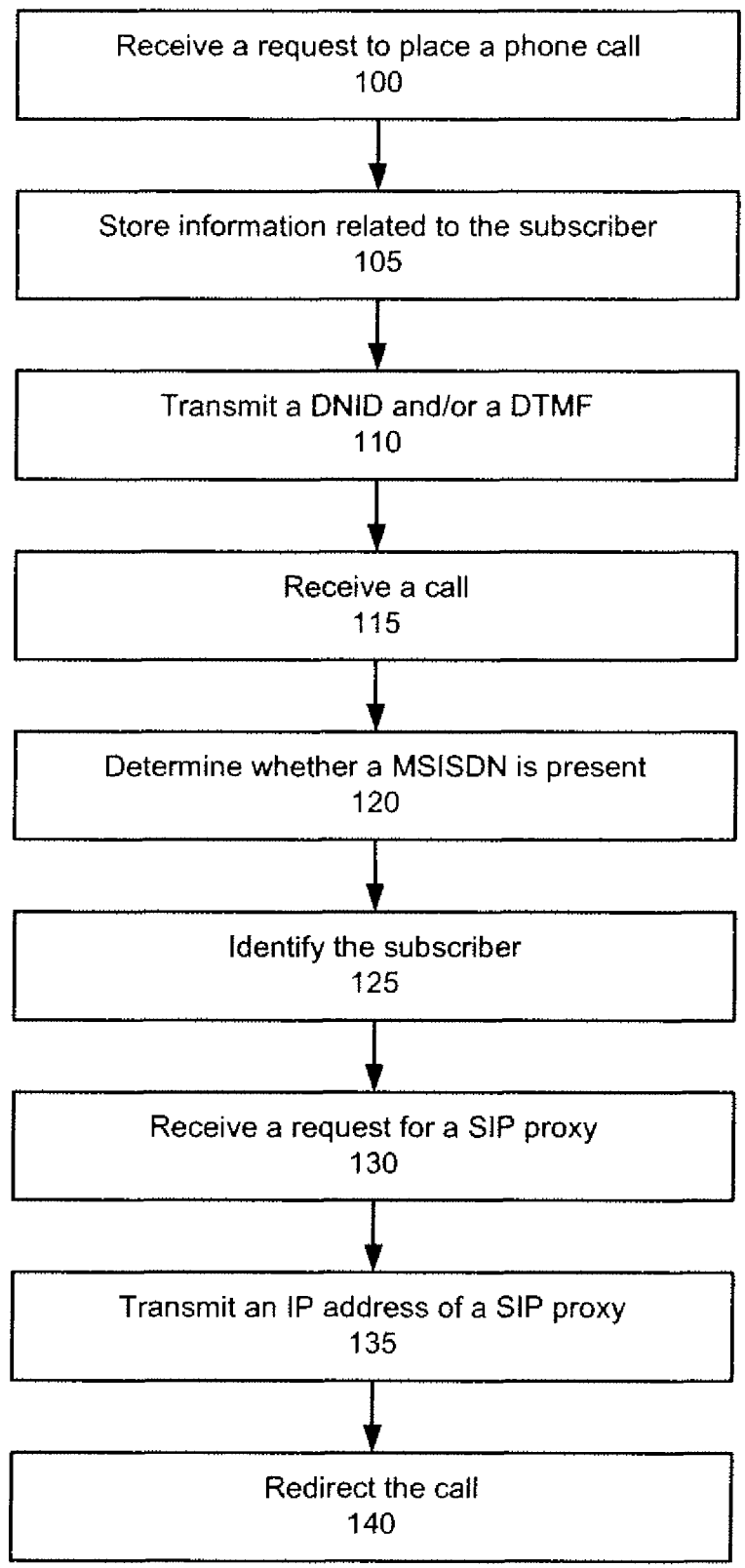
FIG. 1 illustrates a flow chart for an exemplar method of transmitting data between two computing devices.
Figure 2:
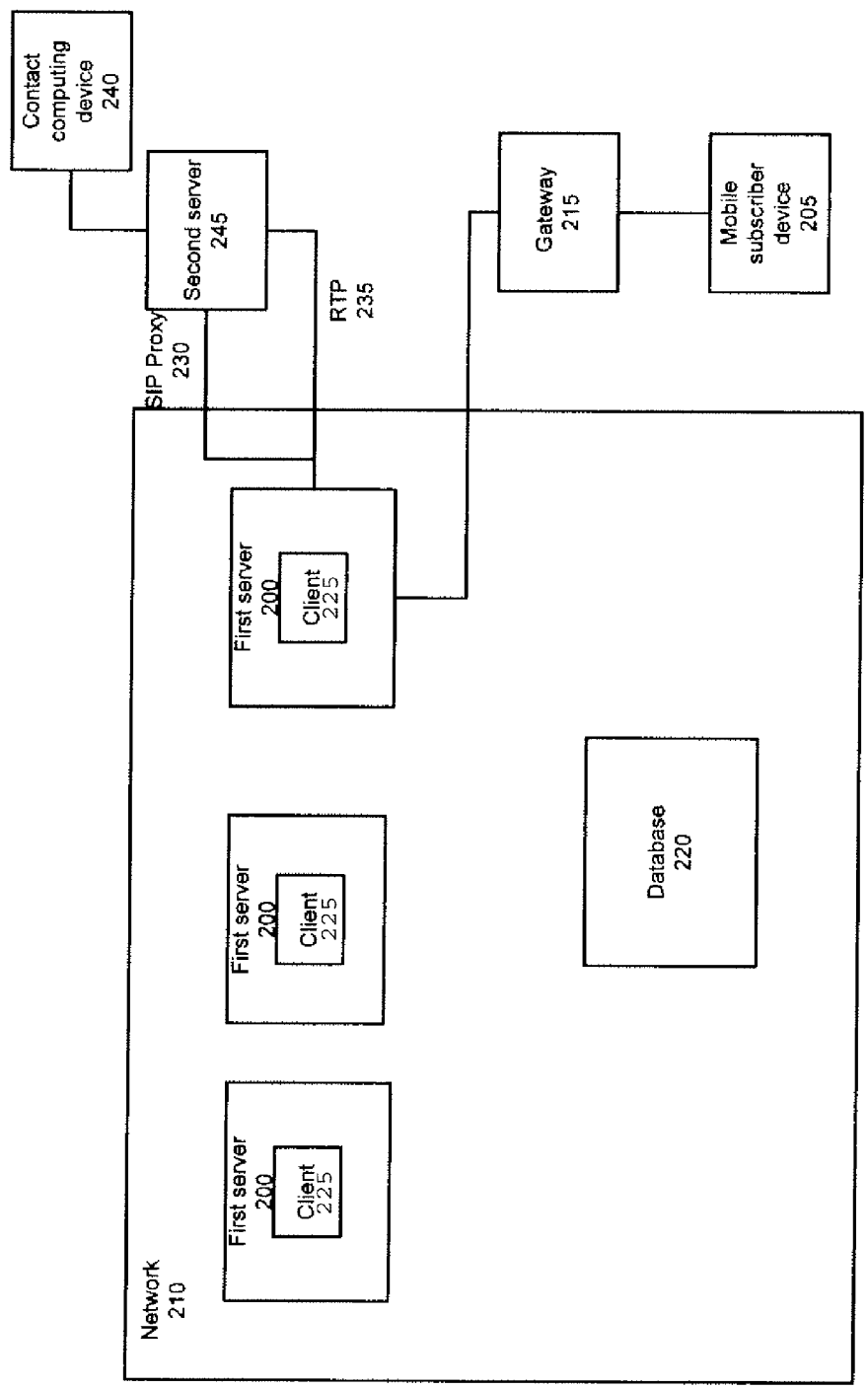
FIG. 2 illustrates an exemplary fat server architecture.

FIG. 1 illustrates a flow chart for an exemplary method of transmitting data between two computing devices to enable communication between the two according to an embodiment. FIG. 2 illustrates an exemplary fat server architecture according to an embodiment and capable of carrying out the steps of FIG. 1.

A request to place a phone call may be received 100 by a server 200. In an embodiment, the request may be initiated by a mobile device 205 utilizing a VoIP network 210. For example, a subscriber may initiate a request by using his mobile device 205 to select a contact to call from an address book.

In an embodiment, the mobile device 205 may transmit a request to the server 200 via a gateway 215, such as a SIP Gateway. In an embodiment, the request may include a session identification number and/or a contact identification number. A session identification may be a unique identifier associated with a calling period. The session identification number may remain valid for the length of an entire calling period, which in an embodiment, may be the period of time from when the application is powered up and connected until the time that the application is powered down. A contact identification number may be a unique identifier associated with a certain contact in an address book. A contact identification number may be assigned to each contact, and may remain valid for the duration of a calling period. In an embodiment, the unique session identification number and the contact identification numbers may expire after the calling period has closed, thus rendering them invalid for subsequent calling sessions.

In an embodiment, one or more of a mobile network code ("MNC"), a mobile country code ("MCC"), the contact identification number, the session identification number, a Mobile Subscriber Integrated Services Digital Network Number ("MSISDN") and the contact's name may be stored 105 in a database 220. An MNC may be used in combination with an MCC to identify a mobile operator or carrier using one or more mobile networks. In an embodiment, a MSISDN may be a number, such as a telephone number, that uniquely identifies a subscription in a mobile network 210.

In an embodiment, the server 200 may transmit 110 a data network identifier ("DNID") and/or a dual-tone multi-frequency ("DTMF") sequence to the mobile device 205. In an embodiment, a DTMF sequence may be a sequence of tones used for telephone signaling.

The mobile device 205 may initiate a call to the DNID and may transmit the DTMF sequence in an embodiment. The server 200 may receive 115 the call and may determine 120 whether a MSISDN is present. If so, the server 200 may identify 125 the subscriber and may retrieve the prepared call from the database 220. If a MSISDN is not present, the server 200 may use the DTMF sequence to locate a prepared call.

In an embodiment, the server 200 may be in communication with one or more clients 225, and, as such, may be considered a fat server. A fat server is a server that supports a plurality of clients, which may be referred to as fat clients. The fat server may be implemented on one or more physical server machines. In an embodiment, a fat client 225 may authorize and/or authenticate the subscriber using a MSISDN or DTMF sequence as discussed above.

In an embodiment, a server 200, such as a fat server, may receive 130 a request for a SIP proxy from a client 205, such as a fat client. The fat server 200 may respond by transmitting 135 an IP address of a SIP proxy 230 to the fat client 225. The server 200 may then redirect 140 the call to a second server 245 via the SIP proxy 230. In an embodiment, authentication and/or authorization information may be transmitted to the SIP proxy 230. As such, the SIP proxy 230 may be made aware of the contact with whom the subscriber wishes to communicate. In an embodiment, the SIP proxy 230 may summon an RTP 235 to provide an audio channel over which the subscriber can communicate. The subscriber's mobile device 205 may then communicate with the contact's computing device 240 over the RTP 235. As such, the server 200 provides a central location where a subscriber may be identified and authorized. In the past, communication may have occurred directly between the server 200 and the contact's computing device 240 because both the server 200 and the computing device 240 were configured to communicate. However, situations may exist where the server 200 is not configured to communicate directly with the contact's computing device 240. As such, the server 200 may require a translator to communicate with the contact's computing device 240. In an embodiment, this responsibility may be delegated to one or more proxies. The server 200 may request and receive a SIP proxy 230 which may in turn create an RTP proxy 235 for audio flow.

It will be appreciated that various of the above-disclosed and other features and functions, or alternatives thereof, may be desirably combined into many other different systems or applications. Also that various presently unforeseen or unanticipated alternatives, modifications variations or improvements therein may be subsequently made by those skilled in the art which are also intended to be encompassed by the following claims.

What is claimed is:

1. A method of transmitting data between two parties, the method comprising:
   receiving, from a mobile device, a request associated with placing a call to a contact;
   storing at least a portion of information associated with the request;
   transmitting one or more of a data network identifier and/or a sequence number to the mobile device;
   receiving the call from the mobile device, wherein the call is initiated to the data network identifier;
   locating, in response to the received call, the stored portion of information associated with the request corresponding to the call;
   receiving a request for a session initiation protocol (SIP) proxy from a client;
   transmitting an internet protocol (IP) address associated with the SIP proxy along with the stored portion of information and/or the sequence number to the client; and
   redirecting the call between the mobile device and the contact to a server via the SIP proxy.

2. The method of claim 1, wherein receiving the SIP proxy request comprises receiving the SIP proxy request that comprises one or more of a session identification number and a contact identification number.

3. The method of claim 1, wherein storing at least the portion of information comprises storing one or more of a mobile network code, a mobile country code, a session identification number, a contact identification number, a mobile subscriber integrated services digital network number and a name associated with the contact.

4. The method of claim 1, wherein receiving the call comprises:
   receiving the call along with the sequence number.

5. The method of claim 4, wherein locating the stored portion of information comprises:
   determining whether the call comprises a mobile subscriber integrated services digital network number;
   if so, using the mobile subscriber integrated services digital network number to locate the stored portion of information; and
   if not, using the sequence number to locate the stored portion of information.

6. The method of claim 1, wherein the client corresponds to a fat client.

7. The method of claim 1, comprising:
   authorizing and/or authenticating the mobile device for the received call based upon authentication and/or authorization information, the authentication and/or authorization information including the stored portion of information and/or the sequence number; and
   transmitting the authentication information to the SIP proxy.

8. The method of claim 1, wherein redirecting the call to a server via the SIP proxy comprises:
   providing, by the SIP proxy, an audio channel by summoning a real-time transfer protocol (RTP); and
   initiating communication with a computing device associated with the contact over the RTP.

9. The method of claim 1, wherein the sequence number corresponds to a dual-tone multi-frequency (DTMF) sequence.

10. A first server configured to facilitate a transmission of data between two parties, comprising:
- means for receiving, from a mobile device, a request associated with placing a call to a contact;
- means for storing at least a portion of information associated with the request;
- means for transmitting one or more of a data network identifier and/or a sequence number to the mobile device;
- means for receiving the call from the mobile device, wherein the call is initiated to the data network identifier;
- means for locating, in response to the received call, the stored portion of information associated with the request corresponding to the call;
- means for receiving a request for a session initiation protocol (SIP) proxy from a client;
- means for transmitting an internet protocol (IP) address associated with the SIP proxy along with the stored portion of information and/or the sequence number to the client; and
- means for redirecting the call between the mobile device and the contact to a second server via the SIP proxy.

11. The first server of claim 10, wherein the means for receiving the call comprises:
- means for receiving the call along with the sequence number.

12. The first server of claim 11, wherein the means for locating the stored portion of information comprises:
- means for determining whether the call comprises a mobile subscriber integrated services digital network number;
- means for using the mobile subscriber integrated services digital network number to locate the stored portion of information, if available; and
- means for using the sequence number to locate the stored portion of information, if the mobile subscriber integrated services digital network number is not available.

13. A non-transitory computer readable medium including instructions, which, when executed by a first server, cause the first server to perform operations to facilitate a transmission of data between two parties, the instructions comprising:
- instructions configured to receive, from a mobile device, a request associated with placing a call to a contact;
- instructions configured to store at least a portion of information associated with the request;
- instructions configured to transmit one or more of a data network identifier and/or a sequence number to the mobile device;
- instructions configured to receive the call from the mobile device, wherein the call is initiated to the data network identifier;
- instructions configured to locate, in response to the received call, the stored, portion of information associated with the request corresponding to the call;
- instructions configured to receive a request for a session initiation o protocol (SIP) proxy from a client;
- instructions configured to transmit an internet protocol (IP) address associated with the SIP proxy along with the stored portion of information and/or the sequence number to the client; and
- instructions configured to redirect the call between the mobile device and the contact to a second server via the SIP proxy.

14. The non-transitory computer readable medium of claim 13, wherein the instructions configured to receive the call comprises:
- instructions configured to receive the call along with the sequence number.

15. The non-transitory computer readable medium of claim 14, wherein the instructions configured to locate the stored portion of information comprises:
- instructions configured to determine whether the call comprises a mobile subscriber integrated services digital network number;
- instructions configured to use the mobile subscriber integrated services digital network number to locate the stored portion of information, if available; and
- instructions configured to use the sequence number to locate the stored portion of information, if the mobile subscriber integrated services digital network number is not available.

16. A first server configured to facilitate a transmission of data between two parties, comprising at least one processor, the at least one processor being configured to:
- receive, from a mobile device, a request associated with placing a call to a contact;
- store at least a portion of information associated with the request;
- transmit one or more of a data network identifier and/or a sequence number to the mobile device;
- receive the call from the mobile device, wherein the call is initiated to the data network identifier;
- locate, in response to the received call, the stored portion of information associated with the request corresponding to the call;
- receive a request for a session initiation protocol (SIP) proxy from a client;
- transmit an internet protocol (IP) address associated with the SIP proxy along with the stored portion of information and/or the sequence number to the client; and
- redirect the call between the mobile device and the contact to a second server via the SIP proxy.

17. The first server of claim 16, wherein the at least one processor is further configured to:
- receive the call along with the sequence number.

18. The first server of claim 17, wherein the at least one processor is further configured to:
- determine whether the call comprises a mobile subscriber integrated services digital network number;
- use the mobile subscriber integrated services digital network number to locate the stored portion of information, if available; and
- use the sequence number to locate the stored portion of information, if the mobile subscriber integrated services digital network number is not available.

* * * * *